United States Patent [19]
Atsumi et al.

[11] Patent Number: 5,517,227
[45] Date of Patent: May 14, 1996

[54] IMAGE FORMING APPARATUS FOR AUTOMATICALLY SETTING IMAGE FORMATION CONDITIONS

[75] Inventors: Tetsuya Atsumi, Tokyo; Hisashi Fukushima, Kawasaki; Nobuatsu Sasanuma, Yokohama, all of Japan

[73] Assignee: Canon Kabushiki Kaisha, Tokyo, Japan

[21] Appl. No.: 79,825

[22] Filed: Jun. 23, 1993

[30] Foreign Application Priority Data

Jun. 26, 1992 [JP] Japan ..................................... 4-169404

[51] Int. Cl.⁶ ..................................................... H04N 1/21
[52] U.S. Cl. ........................................... 347/131; 347/251
[58] Field of Search ..................................... 346/160, 108, 346/76 L, 1.1; 358/494, 500, 498, 443, 452, 443, 448, 494, 298; 347/131, 251, 252, 253, 254, 240

[56] References Cited

U.S. PATENT DOCUMENTS 5,121,230  6/1992  Honma et al. ........................ 358/500

*Primary Examiner*—Mark J. Reinhart
*Attorney, Agent, or Firm*—Fitzpatrick, Cella, Harper & Scinto

[57] ABSTRACT

This invention relates an image forming apparatus capable of automatically adjusting image formation conditions. A transfer medium having a detecting pattern image formed by an apparatus main body is read by an original reading unit. A look-up table for setting latent image formation conditions is corrected on the basis of a read output, thereby correcting image densities in a main-scan direction and/or a sub-scan direction.

11 Claims, 15 Drawing Sheets

IMAGE FORMING APPARATUS FOR AUTOMATICALLY SETTING IMAGE FORMATION CONDITIONS

BACKGROUND OF THE INVENTION

1. Field of the Invention

The present invention relates to a copying apparatus or a laser beam printer which uses electrophotographic techniques.

2. Related Background Art

Referring to FIG. 2 which illustrates a printer, an electrophotographic photosensitive drum 1 as an image bearing member rotates clockwise. A corona charger 2 for evenly charging the surface of the photosensitive drum 1 is constituted by a wire and grid. A charge removal lamp 8 discharges the surface potential of the photosensitive drum 1 to close to 0 V before charging is performed by the primary charger 2. An exposing system 3 consists of a laser beam source, a collimator lens, and a polygon mirror. A developing unit 4 forms a visible image from a latent image formed on the photosensitive drum 1. A cleaner 5 recovers toner remaining on the surface of the photosensitive drum 1.

A transfer sheet feed device 6 transfers the toner image formed on the photosensitive drum 1 onto a recording medium P while feeding the recording medium P held by a drum-like transfer sheet 6a. A transfer charger 7 is also provided. A toner density sensor 10 senses the mixing ratio of the toner and carrier for image formation contained in the developing unit 4. A surface potential detector 11 is means for detecting the surface condition of the photosensitive drum 1. A CCD sensor 14 reads a test patch 22; the test patch 22 illuminated by patch illuminating light sources 12a and 12b is imaged on the CCD sensor 14 through an optical lens 13. A density converter 16 converts an output voltage obtained by the CCD sensor 14 into a density. A central arithmetic circuit 100 manages each detection information described above to control image formation conditions.

FIGS. 3A and 3B are enlarged views showing the exposing system 3, in which a laser unit 31 constituted by, e.g., a semiconductor laser beam source and a collimator lens, and a polygon mirror 32 are illustrated.

FIG. 4 shows a reader (original reading device), in which an original 51, a halogen lamp 52 as a light source for illuminating an original, a mirror 53, a lens 54, a CCD 55, and an image processing unit 56 are illustrated.

Image formation processing will be described below in the order of processing steps.

First, in FIG. 4, the original 51 is illuminated by the halogen lamp 52 to form reflected light proportional to the density of the original image. This reflected light is imaged on the CCD 55 via the mirror 53 and the lens 54 and sequentially decomposed into pixels and at the same time converted into an electrical signal of high or low level. This electrical signal is subjected to magnification changing processing, moving processing, and the like performed by the image processing unit 56 and then supplied to the printer unit.

Subsequently, in FIG. 2, the photosensitive drum 1 is evenly charged by the primary charger 2 and exposed to a laser beam from the optical system 3. On the basis of the image-processed signal from the reader, as shown in FIGS. 3A and 3B, this laser beam forms a potential latent image in the thrust direction of the photosensitive drum 1 through the rotation of the polygon mirror 32 and in the circumferential direction of the photosensitive drum 1 through the clockwise rotation of the photosensitive drum 1. This latent image is developed into a visible toner image by the developing unit 4. The toner image is transferred onto the recording medium P by the transfer charger 7. The above processing steps are executed for each of magenta, cyan, yellow, and black while the developing unit 4 rotates or operates in sequence in the case of a system in which the four colors are fixed. The development results of the four colors are fed to a fixing device (not shown) to yield a full-color image.

The central arithmetic circuit 100, on the other hand, designates an output of a test patch to be detected at a predetermined time interval, forming the test patch on the photosensitive drum in the same manner as described above. This test patch consists of one or a plurality of pattern patches each having a predetermined density. The detected toner density is arithmetically processed by the central arithmetic circuit 100, thereby controlling the image forming means (e.g., the charge potential, the LUT, the toner density, and the transfer current).

FIG. 5 is an enlarged view showing the test patch 22 after being developed.

In copying machines capable of reproducing a continuous gradient, a known technique of PWM (Pulse Width Modulation) is extensively used as means capable of expressing the continuous gradient. This PWM is a method of synthesizing a triangular wave 23 with a period of 200 lpi and an image signal 24 formed on the basis of an image signal, as shown in FIG. 6A, thereby obtaining a superposed portion 25 of the two waves as an image recording signal, as shown in FIG. 6B. As a result, vertical stripes of 200 lpi typical of the rectangular wave are also found in the resulting image.

The reading circuit of the CCD 14 will be described next.

The CCD sensor 14 is driven at a predetermined frequency, and this drive frequency is determined by the pixel size of the CCD, the optical magnification of the CCD, and the feed rate of the sheet feed device 6. As an example, the CCD drive frequency is 123.4 nsec when the pixel size of the CCD is 18 μm×13 μm (sub-scan direction×main-scan direction), the optical magnification is 1:1, and the paper feed rate is 120 mm/sec. This CCD drive frequency is also used as a memory drive frequency when the CCD signal is stored in a memory 26. That is, when the optical image of the test patch 22 is projected onto the CCD 14, the CCD 14 outputs voltages which change in correspondence with the density of the optical image. These voltages from the individual pixels are line-sequentially extracted, subjected to A/D conversion of 8 bits, and stored in the memory circuit 26. In this case, it is more desirable to additionally provide a circuit for removing a reset signal contained in the CCD output.

FIG. 7 shows the state of the memory circuit 26 in which the CCD output is stored.

As shown in FIG. 7, the PWM lines of the test patch shown in FIG. 5 are reproduced in the memory. In the memory circuit 26 shown in FIG. 7, Pmax represents toner image portions of the PWM lines, and Pmin represents an interval between the lines of the toner image. In an image forming apparatus of an ideal system, the Pmax is equal to a CCD output at the time the maximum density of toner image portions of the test patch is detected, and the Pmin is equal to a CCD output at the time no toner density between toner image portions is detected at all. In an image forming apparatus of a practical system, however, the PWM lines are obtained as CCD outputs having smaller widths than Pmax–Pmin of the ideal system under the influence of spread of a latent image or scattering of the image during development and transfer. Note that in the CCD 55 used in the reader, the pixel size is 62.5 μm×20 μm, the optical magnification is 1:1, and the process speed is 160 mm/sec.

The above conventional example, however, has the following problems.

That is, in the formation of a latent image, a laser beam used as the exposing means forms a spot image of 45 μm×75 μm in the central portion of the photosensitive drum, whereas it forms blurred images at the end portions of the photosensitive drum as shown in FIG. 3C because of the reflection angle of the polygon mirror. Therefore, as shown in FIG. 8A, when the input signal to the exposing means is made uniform with respect to the thrust direction as the rotating direction of the photosensitive drum 1 as shown in FIG. 8B, a variation occurs in a toner density after development as shown in FIG. 8C.

In addition, independently of the development shown in FIGS. 8A to 8C, uneven coating of a photosensitive material layer and eccentricity of the rotating shaft of the photosensitive drum give rise to a nonuniform density variation in a toner density after development as shown in FIG. 9B with respect to a uniform input signal in the circumferential direction of the photosensitive drum as shown in FIG. 9A.

The inclination of the wire of the charger 2 with respect to the photosensitive drum 1, as shown in FIG. 10A, and the inclination of a developing sleeve 18 with respect to the photosensitive drum 1, as shown in FIG. 11A, bring about nonuniformities in distances between the photosensitive drum and these members, resulting in density gradients in the thrust direction of the photosensitive drum, as shown in FIGS. 10B and 11B, respectively.

Furthermore, the illuminating light sources 12a and 12b and the optical lens 13 are contaminated by toner scattering inside the image forming apparatus, and this decreases the reading power of the toner density of the test patch. Therefore, no highly precise image correction can be performed by using the patch on the photosensitive drum alone.

SUMMARY OF THE INVENTION

It is an object of the present invention to solve the above conventional problems and provide an image forming apparatus capable of forming an image which is even throughout the entire image formation region of a photosensitive drum.

In order to achieve the above object, an image forming apparatus capable of automatically adjusting image formation conditions according to the present invention comprises original reading means for reading an original image and outputting the read result as an electrical signal, pattern latent image forming means having a digital optical system for forming an electrostatic latent image based on a predetermined pattern to be detected in an image formation region of an electrophotographic photosensitive body, developing means for developing the formed pattern latent image by using a toner, transferring means for transferring the pattern developed image formed on the photosensitive body onto a transfer medium, fixing means for fixing the pattern image on the transfer medium and outputting the fixed image, and correcting means for correcting a look-up table for setting latent image formation conditions on the basis of the output indicating the read result from the original reading means. The transfer medium having the pattern image to be detected is read by the original reading means, and the look-up table for setting the latent image formation conditions is corrected on the basis of an output indicating the read result. For example, the look-up table correcting means corrects look-up tables in a main-scan direction and/or a sub-scan direction as scan directions of the digital optical system.

DESCRIPTION OF THE PREFERRED EMBODIMENTS

Embodiment 1

Figure 1:
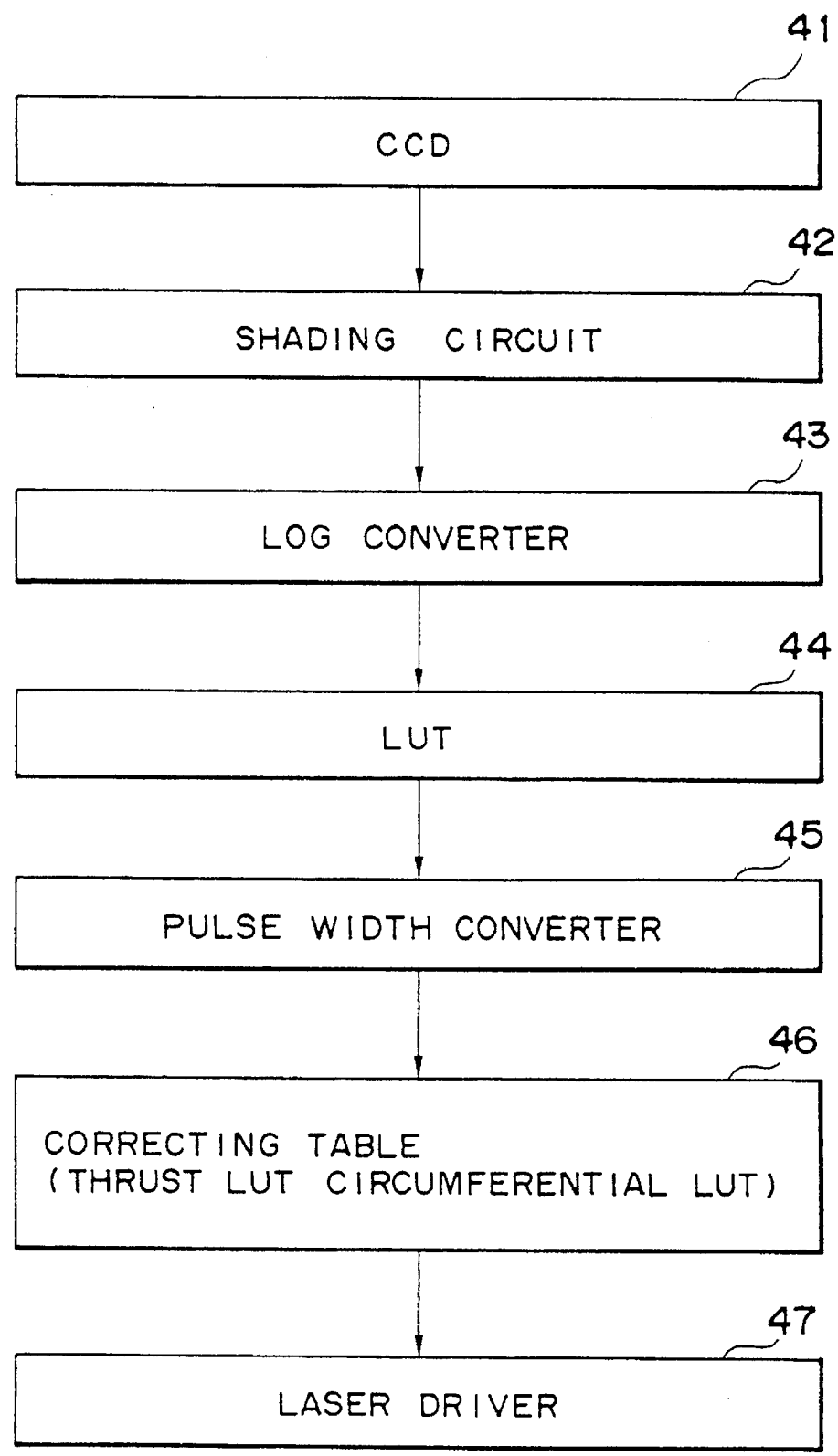
FIG. 1 is a flow chart showing one control sequence according to the present invention.

FIG. 1 is a block diagram for explaining the first embodiment of the present invention. According to this embodiment, an image with an even density in the thrust direction of a photosensitive drum can be obtained with respect to a uniform input signal through the following steps.

The image formation procedure of an apparatus of this embodiment is the same as that of the above conventional apparatus except that a uniform patch which covers the entire image formation region on a photosensitive drum is used as a test patch and CCD sensors (12a, 12b, 13, and 14) as means for detecting the test patch on the photosensitive drum are not necessarily used, so a detailed description thereof will be omitted.

Figure 2:
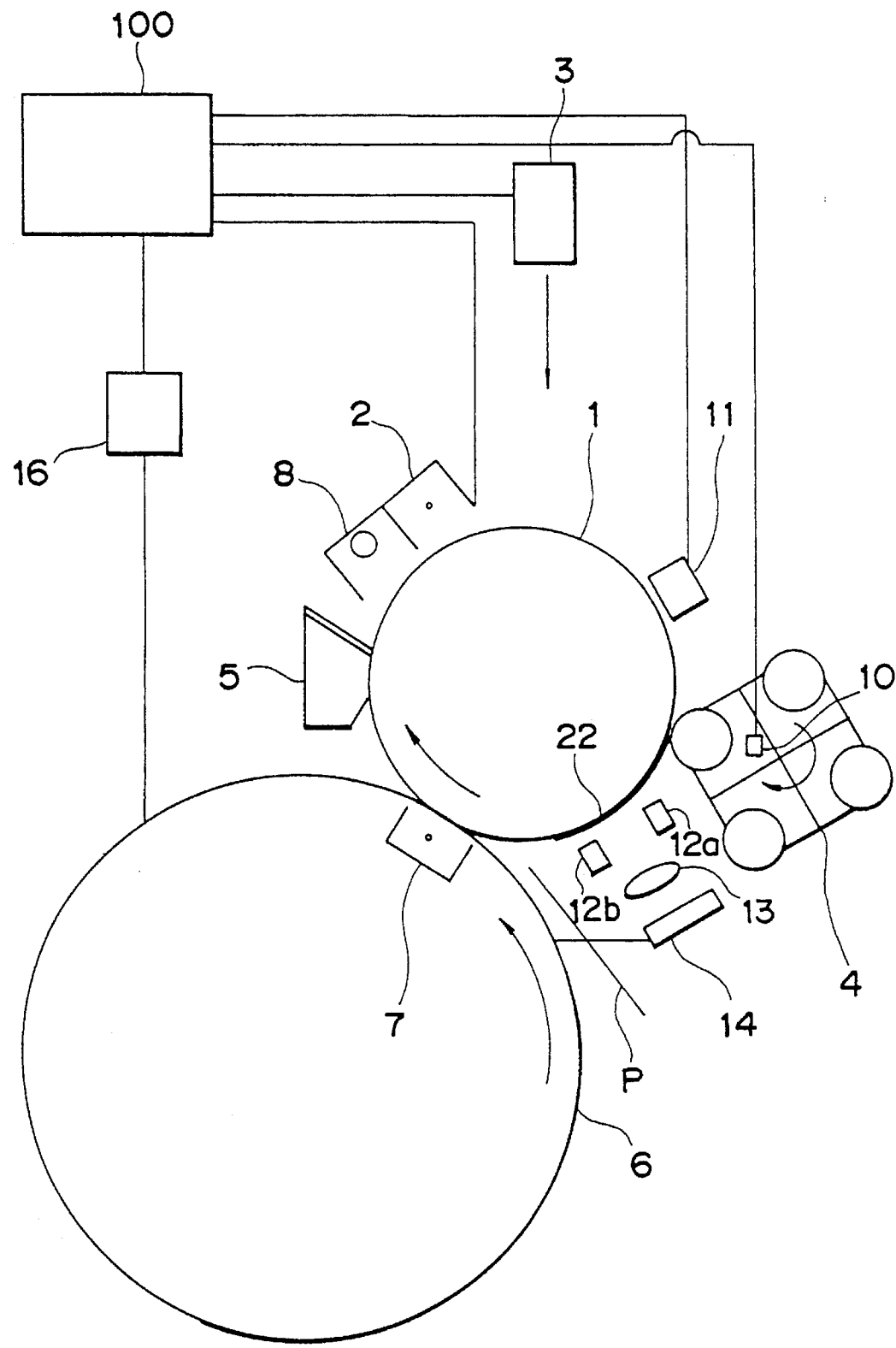
FIG. 2 is a view for explaining the overall arrangement of an electrophotographic apparatus to which the present invention is applicable.
Figure 3A:
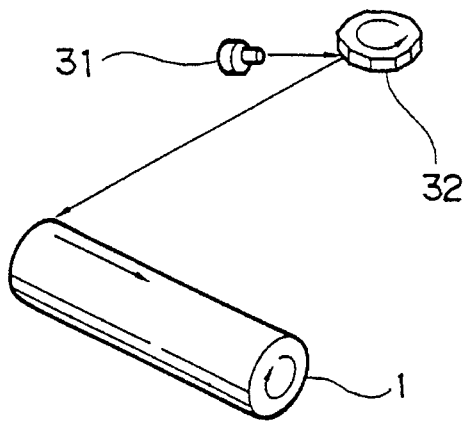
FIG. 3A is a perspective view showing a scan condition of a scanning optical system.
Figure 3B:
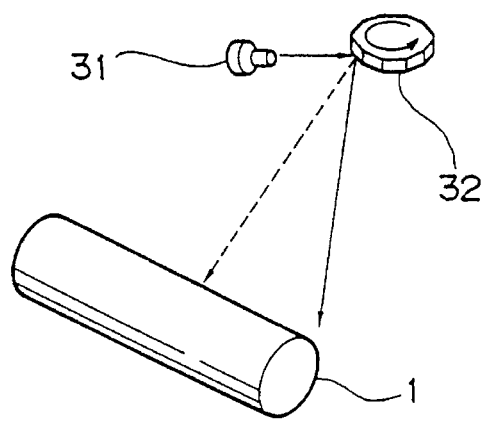
FIG. 3B is a perspective view showing a scan condition of the scanning optical system and FIG. 3C is a view showing dot shapes formed on a photosensitive drum as a result of the scan.
Figure 3C:
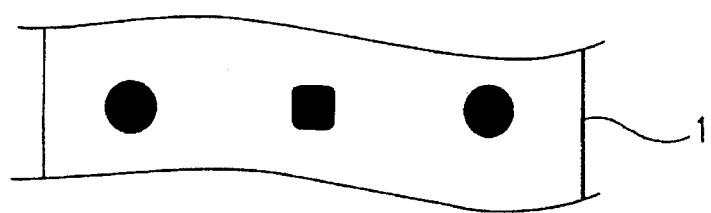
Figure 4:
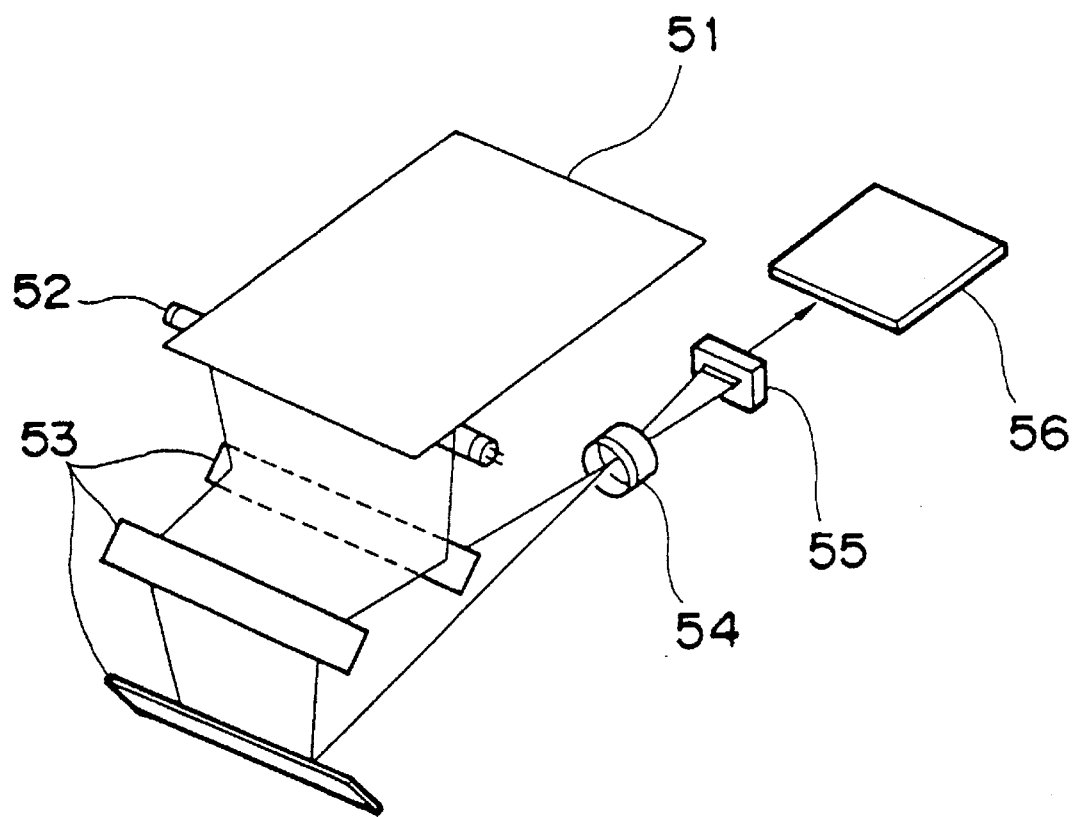
FIG. 4 is a partial perspective view showing a reading optical system.
Figure 5:
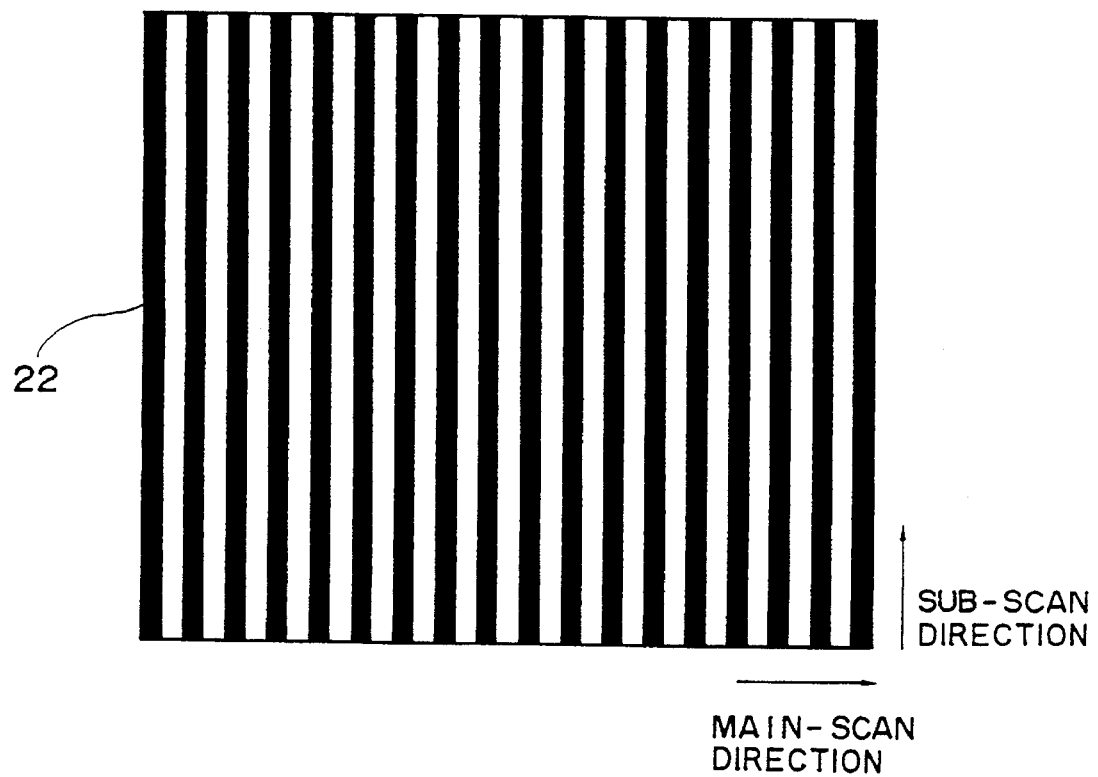
FIG. 5 is a view for explaining a test patch.
Figure 6A:
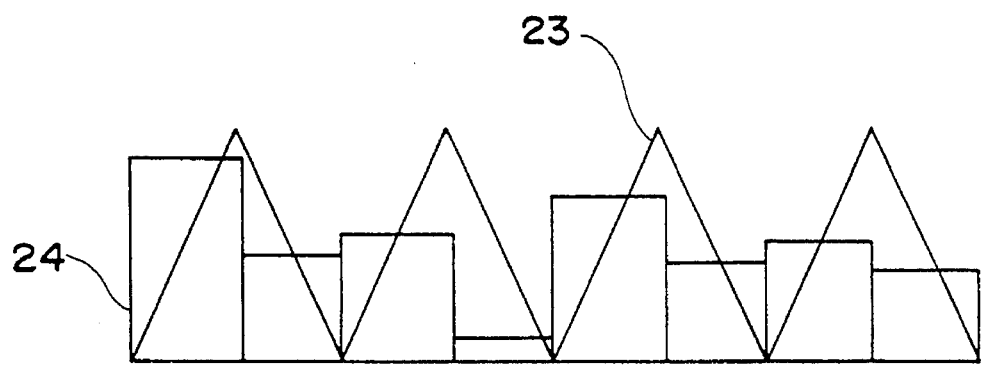
FIG. 6A is a timing chart showing a PWM signal.
Figure 6B:
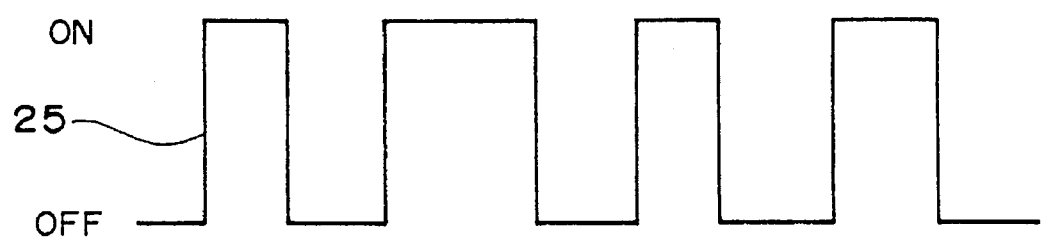
FIG. 6B is a timing chart showing an image recording signal.
Figure 7:
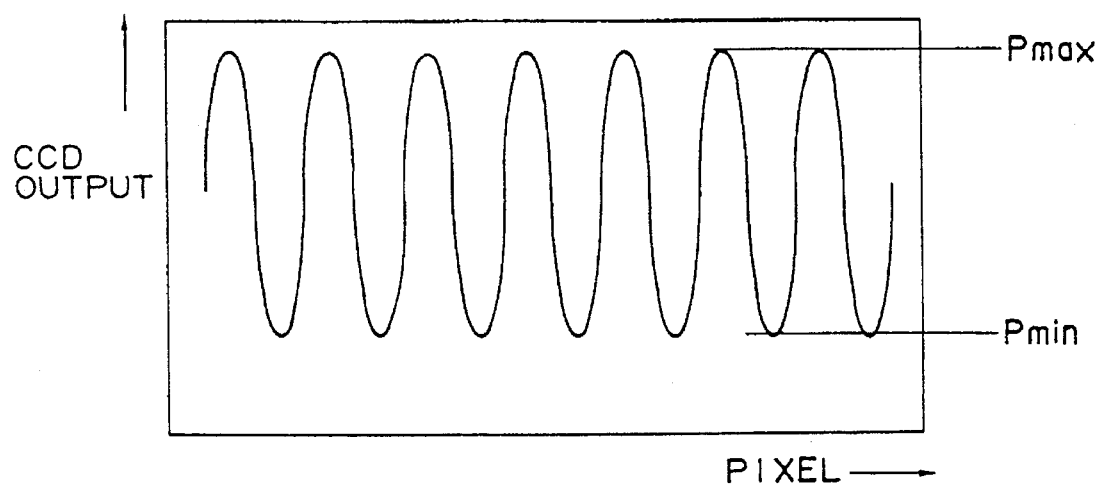
FIG. 7 is a view showing the content of a memory.

In the present invention, a transfer medium on which a test patch of a toner image (FIG. 5) is fixed by a fixing device is placed on an original table and read by a reader mentioned earlier with reference to FIG. 4. In this case, the CCD 55 shown in FIG. 4 plays the same role as the CCD sensor 14 shown in FIG. 2, and an electrical signal from the test patch supplied to a central arithmetic circuit 100 is converted into a density.

Subsequently, in a correcting table (thrust LUT) in the thrust direction of the photosensitive drum, which is calculated from a density variation detected in the thrust direction as a main-scan direction of the photosensitive drum, a coefficient to be multiplied to the input signal is set to 0.50 to 2.00 so that a density variation A in the thrust direction of the photosensitive drum, which is obtained by reading the test patch with a uniform input signal in FIG. 12A becomes an original ideally even density B. FIG. 12B is a graph showing coefficients obtained every four lines by setting the number of lines used in PWM to 400 lines/inch, in which the pattern of a thrust LUT consisting of a memory size of about 1,250 is illustrated.

Figure 8A:
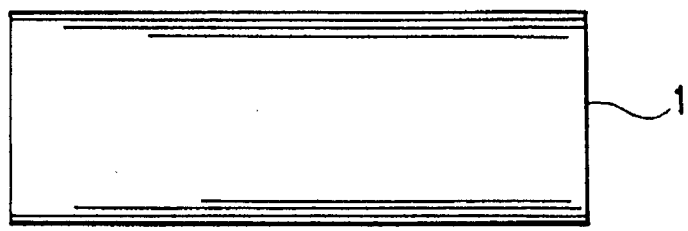
FIGS. 8A to 8C are a view and graphs for explaining the densities of input signals on a photosensitive drum.
Figure 8B:
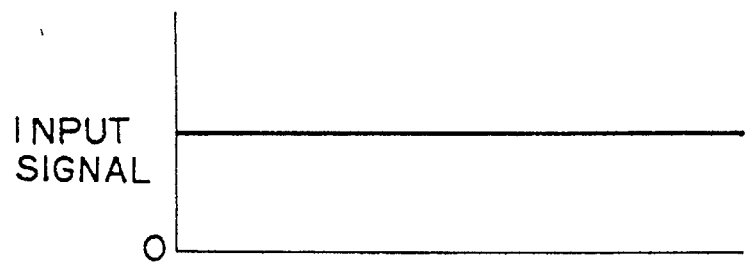
Figure 8C:
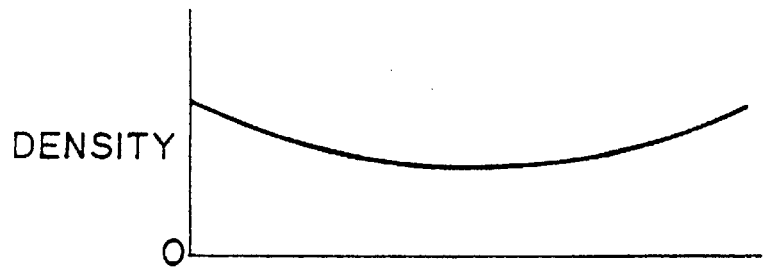
Figure 9A:
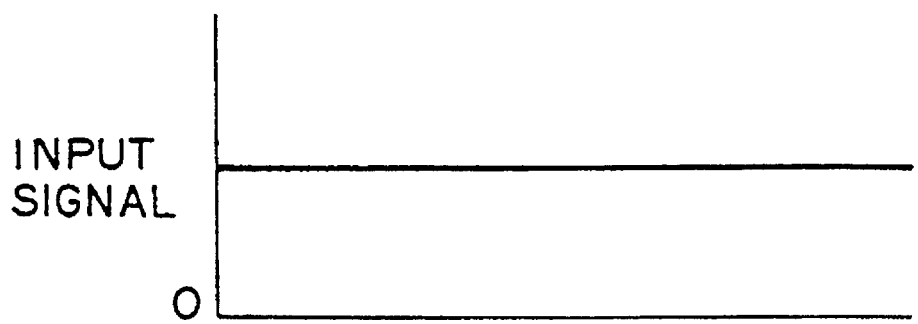
FIGS. 9A and 9B are graphs for explaining the densities of input signals on a photosensitive drum.
Figure 9B:
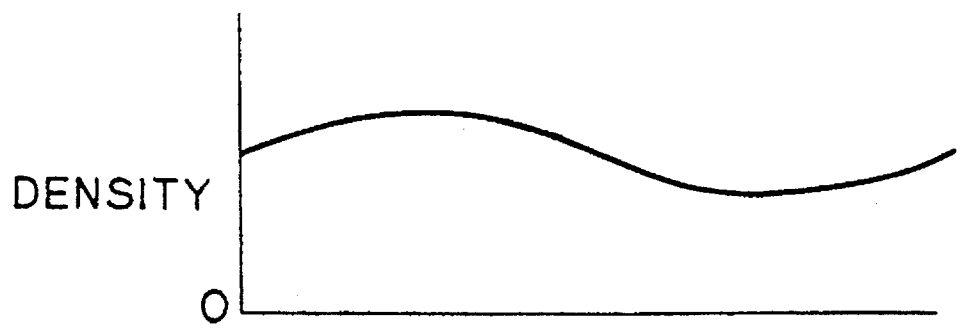
Figure 10A:
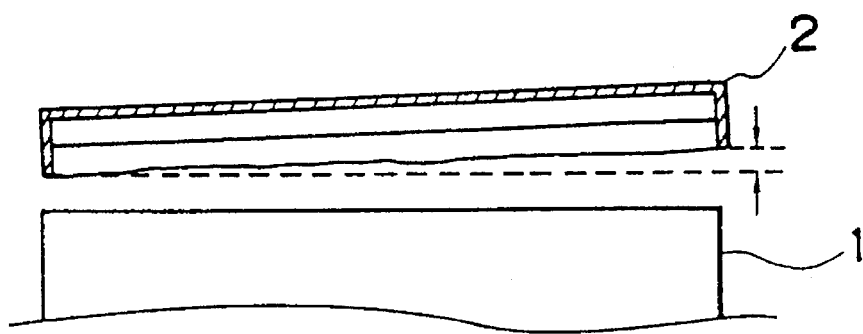
FIG. 10A is a view for explaining a countermeasure against a problem caused in the thrust direction by a charger and FIG. 10B is a graph for explaining the density obtained by the countermeasure shown in FIG. 10A.
Figure 10B:
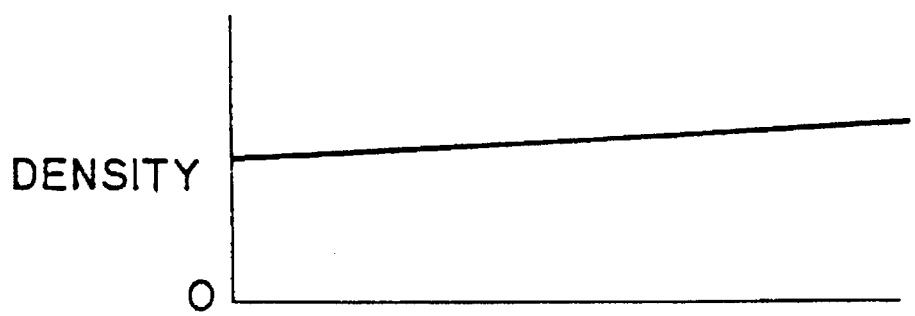
Figure 11A:
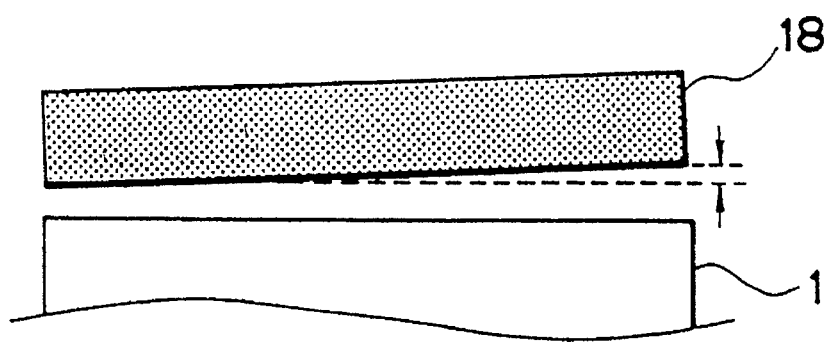
FIG. 11A is a view for explaining a countermeasure against a problem caused in the thrust direction by a developing unit and FIG. 11B is a graph for explaining the density obtained by the countermeasure shown in FIG. 11A.
Figure 11B:
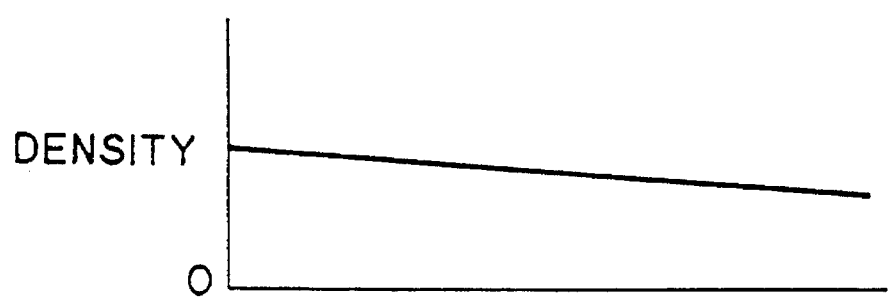

Actual image correction will be described below. Referring to FIG. 1, a CCD 41 color-separates image information into R, G, and B signals, and a shading circuit 42 corrects variations in an output that the CCD originally had. A LOG converter 43 converts the resulting image information into M, Y, and K color signals. An LUT 44 of a conventional type for correcting gradation or $\gamma$ (gamma) outputs a signal corresponding to the image information, and a pulse width converter 45 performs PWM. A correcting table (thrust LUT) 46 according to the present invention corrects the resulting image information. Subsequently, a laser optical system 3 (FIG. 2) is driven by an output signal from a laser driver 47 to output the image information as a laser beam. Consequently, an image with an even toner density shown in FIG. 12C could be obtained although the input signal from the CCD 41 had a density level in the thrust direction shown in FIG. 8B.

Note that the table for correction is obtained by calculating an average value of a set of four lines in this embodiment, but the table is preferably obtained by calculating the coefficient of each line in order to obtain an image with a higher image quality.

Embodiment 2

Figure 12A:
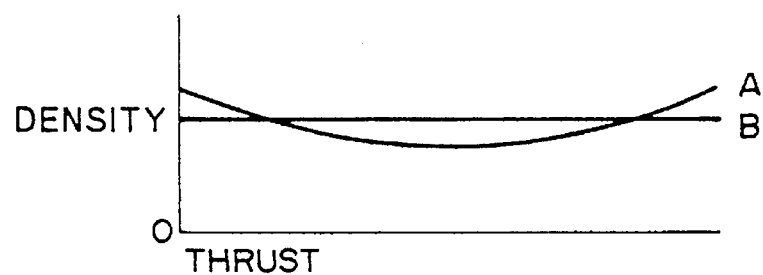
FIGS. 12A to 12C are graphs for explaining a countermeasure performed by a scanning optical system.
Figure 12B:
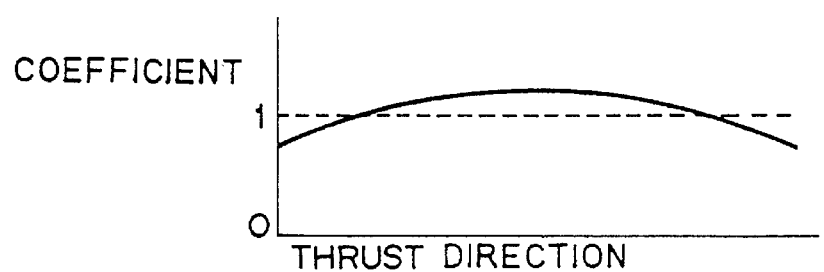
Figure 12C:
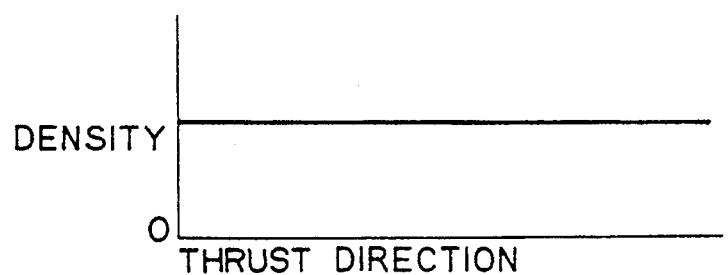
Figure 13A:
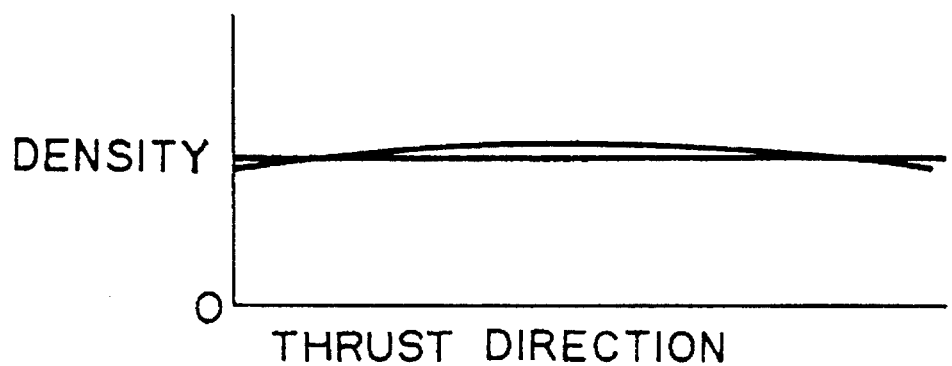
FIGS. 13A and 13B are graphs for explaining a countermeasure realized by a scanning optical system.
Figure 13B:
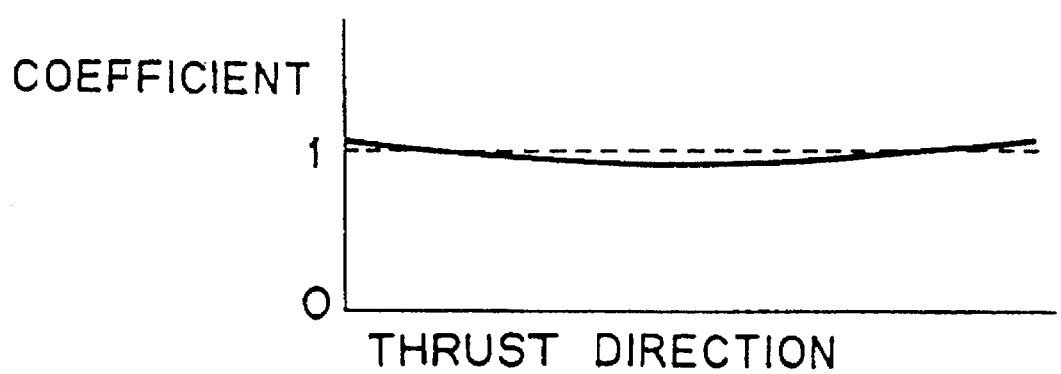

In FIGS. 12A to 12C, the input signal has 180 levels. When the input signal has 30 levels, graphs shown in FIG. 13A (a density variation A' and an ideal density B' in the thrust direction of a photosensitive drum) and FIG. 13B (a thrust LUT in the case of FIG. 13A) are obtained. That is, when the input signal has 180 levels, blurred laser beams superpose on each other to increase the densities at the end portions. When the input signal has 30 levels, on the other hand, laser beams do not superpose on each other, leading to decreases in density at the end portions.

In this case, it is known that the directions of density variations change near 100 levels at the end portions and the central portion in the thrust direction of a photosensitive drum. Therefore, image correction is performed by using the thrust LUT shown in FIG. 12B, when the number of levels of the input signal from the CCD 41 shown in FIG. 1 is larger than 100 levels, and the thrust LUT shown in FIG. 13B, when the number of levels of the input signal is smaller than 100 levels. Such an application of the thrust LUT corresponding to the density level was also effective in obtaining a nearly even density regardless of the input signal level. Images with higher image qualities, however, could be obtained by increasing the number of levels of an input signal that the thrust LUT had or by performing interpolation between the thrust LUTs.

Embodiment 3

Figure 14A:
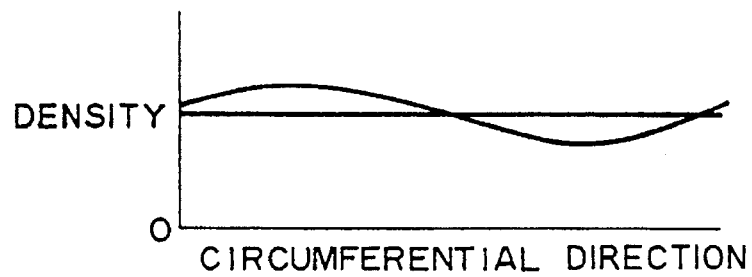
FIGS. 14A to 14C are graphs for explaining a countermeasure against the problem in the circumferential direction.
Figure 14B:
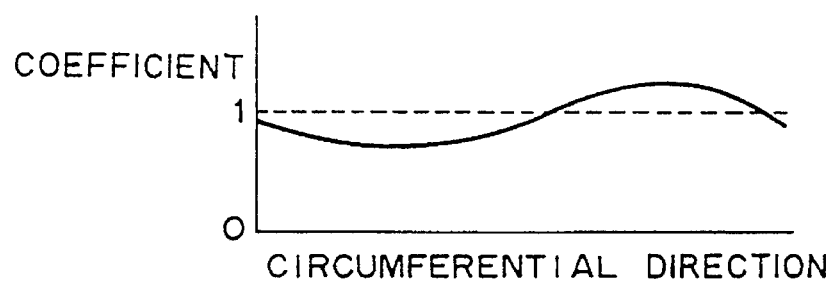
Figure 14C:
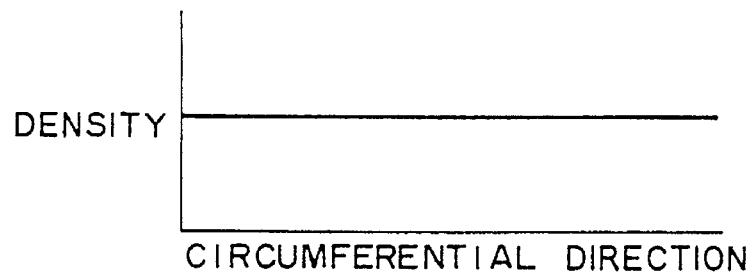

In the above first and second embodiments, the correcting tables are obtained in the thrust direction of a photosensitive drum. The present invention is similarly applicable to the circumferential direction as the rotating direction of a photosensitive drum, which is also a sub-scan direction. That is, an even density could be obtained in the circumferential direction at the end portions of a photosensitive drum as shown in FIG. 14C on the basis of a density variation A and an ideal density B in the circumferential direction at the end portions of the photosensitive drum shown in FIG. 14A and a correcting table (circumferential LUT) shown in FIG. 14B, which was obtained from FIG. 14A.

In addition, an image which was nearly uniform throughout the entire region in the circumferential direction of the photosensitive drum could be formed by also obtaining a circumferential LUT at the central portion in the thrust direction of the photosensitive drum and performing interpolation between the two circumferential LUTs as in the second embodiment.

In this embodiment, one circumferential LUT is obtained in the circumferential direction, and one or two circumferential LUTs are obtained in the thrust direction. To obtain better images, however, it is preferable to form a larger number of objects to be corrected at a smaller angular interval in the circumferential direction of the photosensitive drum.

Embodiment 4

Figure 15:
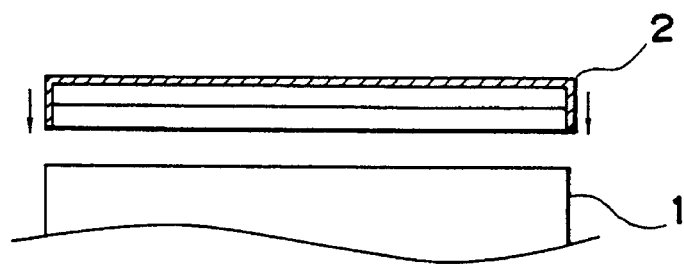
FIG. 15 is a view for explaining a countermeasure for solving a problem in the circumferential direction caused by a charger.
Figure 16:
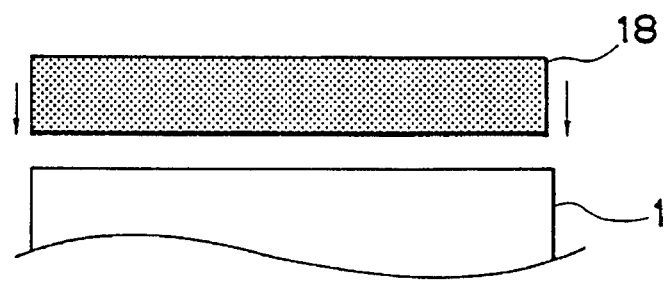
FIG. 16 is a view for explaining a countermeasure for solving a problem in the circumferential direction caused by a developing unit.
Figure 17:
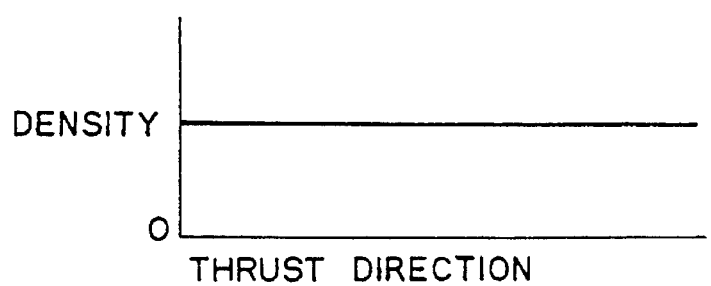
FIG. 17 is a graph for explaining the density obtained by the countermeasures shown in FIGS. 15 and 16.

As a countermeasure against the density gradients in the thrust direction of a photosensitive drum as shown in FIGS. 10A to 11B, a wire and a sleeve as discharge electrodes of a charger 2 and a developing sleeve 18 of a developing unit are moved in directions indicated by arrows in FIGS. 15 and 16 by driving means, such as an eccentric cam or a plunger, thereby changing the distances of these parts from the photosensitive drum. As a result, a density gradient could be eliminated as shown in FIG. 17.

As has been described above, a patch which is uniform throughout the entire image region on a photosensitive drum is used as a test patch that is preferably formed on the photosensitive drum. A reader for reading an original is used as reflected light quantity detecting means to read a fixed image of this test patch, thereby detecting density variations in the thrust direction and/or the circumferential direction of the photosensitive drum. Thereafter, by performing latent image formation involving formation of an output density table for executing correction, adjustment of the height of a wire in a primary charger, and adjustment of the inclination between the photosensitive drum and a developing sleeve, or by changing the development conditions simultaneously, a stable density can be obtained in an image in the entire image region.

In the above embodiments, the color toner image is formed by superimposing some color toner images on the cut-sheet like transfer material. However, it is possible to superimpose the color toner image on the intermediate transfer belt and thenafter the toner image on the belt as a whole.

What is claimed is:

1. An image forming apparatus capable of automatically adjusting image formation conditions, comprising:

original reading means for reading an original image to output the read result as an electrical signal;

pattern latent image forming means having a digital optical system for forming an electrostatic latent image based on a predetermined detecting pattern in an image formation region of an electrophotographic photosensitive body;

developing means for developing the formed pattern latent image by using a toner;

transferring means for transferring the pattern developed image formed on said photosensitive body onto a transfer medium;

fixing means for finally fixing the pattern image on the transfer medium and outputting the fixed image; and correcting means for correcting a charging condition of latent image formation conditions on the basis of the read output from said original reading means, wherein the transfer medium having the detecting pattern image is read by said original reading means, and a charge quantity in a main-scan direction as a scan direction of said digital optical system is corrected on the basis of a read output.

2. An apparatus according to claim 1, wherein the correction of the charge quantity is performed by changing a distance between said photosensitive body and a charge electrode of charging means.

3. An image forming apparatus capable of automatically adjusting image formation conditions, comprising:

original reading means for reading an original image to output the read result as an electrical signal;

pattern latent image forming means having a digital optical system for forming an electrostatic latent image based on a predetermined detecting pattern in an image formation region of an electrophotographic photosensitive body;

developing means for developing the formed pattern latent image by using a toner;

transferring means for transferring the pattern developed image formed on said photosensitive body onto a transfer medium;

fixing means for finally fixing the pattern image on the transfer medium and outputting the fixed image; and correcting means for correcting developing conditions of said developing means on the basis of the read output from said original reading means, wherein the transfer medium having the detecting pattern image is read by said original reading means, and a developing power in a sub-scan direction as a scan direction of said digital optical system is corrected on the basis of a read output, wherein the correction of the developing power is performed by changing a distance between said photosensitive body and a developing roller of said developing means.

4. A density adjusting method for a copying apparatus, comprising the steps of:

copying a test image;

reading the test image on a copied recording member and outputting an electric signal group at a reader portion of said copying apparatus;

providing a predetermined converting treatment to the electric signal group and converting the electric signal to density signal group; and correcting the converting treatment so as to reduce a variation of the density signal group.

5. A density adjusting method according to claim 4, further comprising, prior to said converting step, a step for shading the electric signal group.

6. A density adjusting method according to claim 4, wherein the test image has plural whole images arranged in parallel.

7. A density adjusting method according to claim 6, wherein the reader portion has a sensor outputting the electric signal, and the recording member is mounted on the reader portion as that the whole images becomes substantially parallel to a main scan direction of the sensor.

8. A density adjusting method according to claim 4, wherein in said converting step, the converting treatment is given by using a converting table, and in said correcting step, the correcting table is corrected.

9. A density adjusting method according to claim 4, wherein, in the reading step, the test image is formed by said copying apparatus which includes a photosensitive body, exposure means for exposing the photosensitive body based on the density signal to form an electrostatic image, developing means for developing the electrostatic image, transfer means for transferring the developed image onto a transfer member, and fixing means for fixing the transferred image.

10. A density adjusting method according to claim 9, wherein, in the correcting step, the density signal group is used to alter the operation of said exposure means which has a light source to be light-emitted by a drive pulse, and the density is varied by varying width of the drive pulse.

11. A density adjusting method according to claim 4, wherein said correcting step corrects the converting treatment so that the density signal becomes to a predetermined value, respectively.

* * * * *

UNITED STATES PATENT AND TRADEMARK OFFICE
CERTIFICATE OF CORRECTION

PATENT NO. : 5,517,227

DATED : May 14, 1996

INVENTORS : Tetsuya Atsumi, et al.

It is certified that error appears in the above-identified patent and that said Letters Patent is hereby corrected as shown below:

COLUMN 8

Line 32, "as" should read --so-- and "becomes" should read --become--.

Signed and Sealed this

Twenty-ninth Day of August, 2000

Attest:

Q. TODD DICKINSON

*Attesting Officer*      *Director of Patents and Trademarks*